June 28, 1966      P. J. SELGIN      3,258,686
MAGNETIC AND OPTICAL DIFFERENTIAL THICKNESS MEASURING INSTRUMENT
Filed Aug. 28, 1964
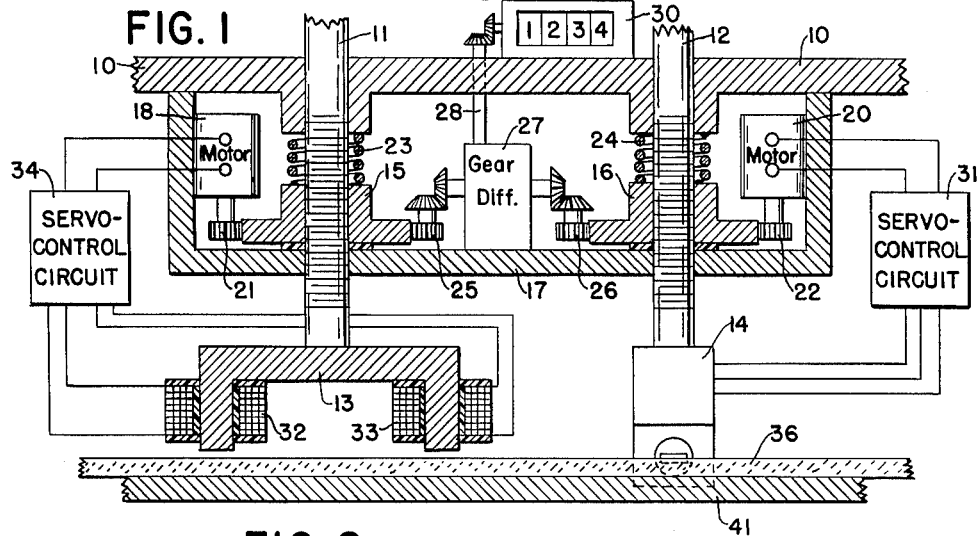
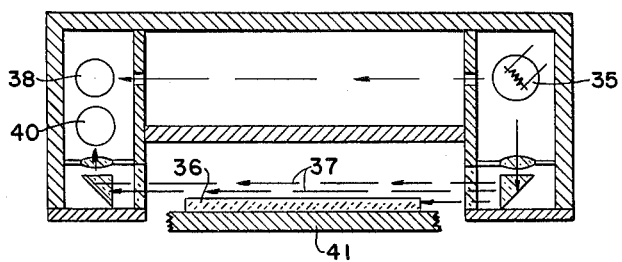
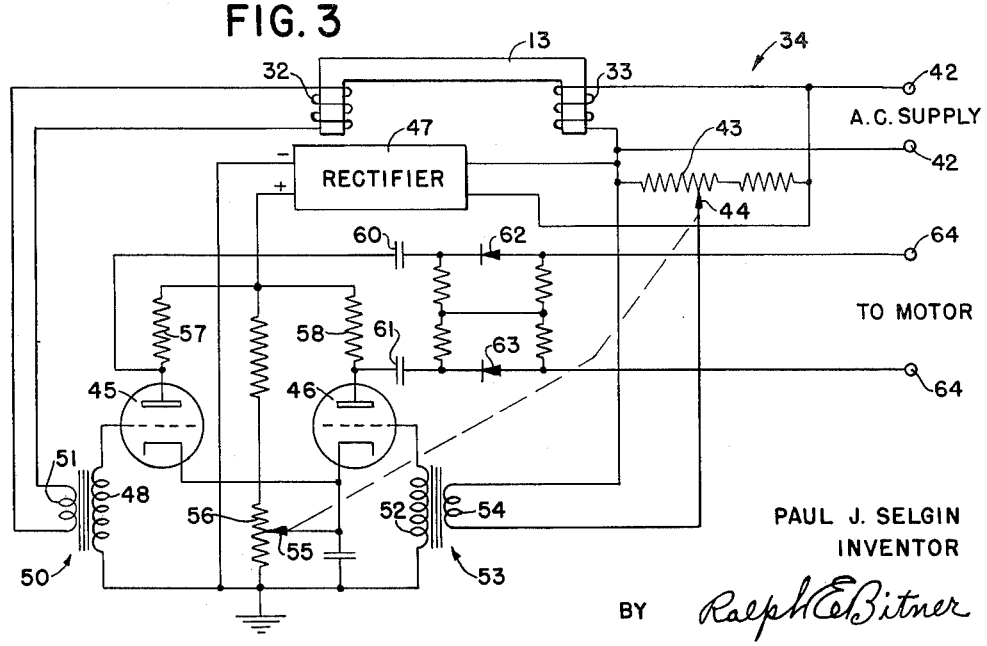
PAUL J. SELGIN
INVENTOR
BY Ralph H. E. Bitner
ATTORNEY

United States Patent Office 3,258,686
Patented June 28, 1966

3,258,686
MAGNETIC AND OPTICAL DIFFERENTIAL
THICKNESS MEASURING INSTRUMENT
Paul J. Selgin, Bethel, Conn., assignor to Automatic Control Devices, Inc., a corporation of Connecticut
Filed Aug. 28, 1964, Ser. No. 392,839
8 Claims. (Cl. 324—34)

This invention relates to a differential measuring instrument for determining the thickness of a non-magnetic sheet or web as it passes over a magnetic surface. The invention has particular reference to a measuring device for determining the thickness of resilient sheets supported by magnetic surfaces which are generally inaccessible. The position of the top surface of the sheet may be determined by a beam of light or by any other convenient method. The lower surface of the sheet is determined by a magnetic sensing head.

The invention has particular usefulness in cases where calendered products are manufactured. Some of the well known means for measuring thickness cannot be relied upon for several reasons. If the top surface of the web is sensed by a mechanical applicator, the resilient material is compressed and the true thickness cannot be measured. If the position of the bottom is assumed to be constant and fixed, inaccuracies will result because in all manufacturing processes the supporting surface, which is the surface of a roller, is subject to variations in position because of movement in the bearings. The invention not only provides an optical and a magnetic sensing head to measure the positions of the top and bottom surfaces, it also combines these two measurements by a gear differential and gives a visual indication or a recording of the thickness.

One of the objects of this invention is to provide an improved differential measuring instrument which avoids one or more of the disadvantages and limitations of prior art arrangements.

Another object of the invention is to determine the positions of the top and bottom surfaces of a resilient sheet without making actual contact with either surface.

Another object of the invention is to measure the thickness of a resilient sheet while the sheet is in motion.

Another object of the invention is to measure the thickness of a moving sheet or layer which is not accessible on both sides at any position during a manufacturing process.

Another object of the invention is to provide a visual indication or recording of the thickness of the sheet at all times.

Another object of the invention is to measure the thickness of a sheet at all points across its width. This measurement can be made with an accuracy which is independent of the accuracy of the means used to support the movable measuring means.

The invention includes a measuring means for determining the position of the top surface of a sheet without making resilient contact on the sheet. A magnetic sensing means is provided for determining the top surface of a magnetic supporting means on which the sheet moves. Each sensing means is adjusted for distance by a servomotor and circuit and a gear differential is coupled between each of the motors to provide a visual indication of the sheet's thickness.

For a better understanding of the present invention, together with other and further objects thereof, reference is made to the following description taken in connection with the accompanying drawings.

FIG. 1 is a cross sectional view, showing some portions in block, of the complete mechanism.

FIG. 2 is a cross sectional view of one form of sensing means which may be used to determine the top surface of the material to be measured.

FIG. 3 is a schematic diagram of connections showing the servo-control circuit which may be used to couple the magnetic sensing unit to its associated servomotor.

Referring now to FIG. 1, the measuring circuit includes a base member 10 which is secured to the apparatus and which represents a basis from which all measurements are to be made. Two screws 11 and 12 are journaled in bearings which are a part of the base, these screws respectively supporting a magnetic yoke 13 and optical sensing device 14. The screws 11 and 12 are maintained in position by two nuts 15 and 16, each nut supported on a washer and resting against a portion of a casing 17 which is secured to the base member 10. Each screw 15 and 16 is coupled respectively to a servomotor 18, or 20 by means of pinions 21 and 22. The nuts 15 and 16 are urged against their washers by helical springs 23 and 24.

The position of the screws 11 and 12 may be determined by the position of nuts 15 and 16 and, because of this, pinions 25 and 26 are coupled to the screw peripheries and are connected to a gear differential mechanism 27 with a resultant shaft 28 which turns an indicator means 30. The indicator means 30 may be a counter mechanism which shows figures, indicating the position of shaft 28, or the indicating means may be part of a recording instrument.

The sensing device which determines the position of the top surface of the sheet of material may be an optical device which projects a beam of light at grazing incidence across the top surface of the sheet. This device has been described in prior publications and is shown in detail in FIG. 2. The output of this sensing means is applied to a first servo-controlled circuit 31, the output of which is applied to motor 20 to turn the pinion 22 responsive to the position of sensing means 14. In a similar manner sensing device 13 includes an exciter winding 33 and a detector winding 32, both of which are connected for comparison to a servo control circuit 34, the output of which is connected to motor 18. The pinion 21 of this motor is connected to nut 15.

The operation of the measuring instrument shown in FIG. 1 will now be described in general terms. When the power is first turned on, coil 33 in the magnetic sensing device is supplied with alternating current and a lamp 35 in the optical sensing device is lighted. Other power supply circuits are also activated to supply current and voltage to rectifiers, vacuum tubes, and lamps. The optical sensing device 14 is now automatically raised or lowered so that it positions itself in accordance with the top surface of a sheet or web 36. This positioning is done by the aid of a light beam 37, two photoconductive cells 38 and 40, the servo control circuit 31, and the motor 20. Nut 16 is turned so that the screw 12 is raised or lowered to its proper position.

The magnetic sensing unit which includes a core 13 and coils 32 and 33 is also automatically raised or lowered so that it bears a predetermined relationship to the magnetic supporting base 41. This positioning is accomplished by the interaction of coil 32, servo control circuit 34, and motor 18. The result of this action is a rotation of nut 15 which either raises or lowers screw 11 until the proper position is obtained. As mentioned above, the double rotation of nuts 15 and 16 is communicated to the gear differential 27 and the result is shown on indicator 30. The action of the optical sensing device 14 is described in copending patent application Serial No. 392,214, filed August 26, 1964.

The magnetic sensing head includes a U-shaped core 13 having coils 32 and 33 on each of its ends. A possible circuit associated with this device 34 is shown in FIG. 3 and comprises a pair of input terminals 42 which are to be connected to a source of alternating current power. The supply terminals are connected directly to coil 33 which is supplied with alternating current at all times. Terminals 42 are also connected to a voltage divider 43 which permits an adjustable voltage to be derived from this circuit by means of an adjustable contact 44. The control circuit also includes two vacuum tube triodes 45 and 46, each of these tubes being supplied with direct current power by a rectifier circuit 47 which is also connected to the supply terminals.

The control electrode of triode 45 is connected to the secondary winding 48 of a transformer 50 whose primary winding 51 is connected directly to winding 32 on one of the ends of core 13. The control electrode of triode 46 is connected to the secondary winding 52 of a second transformer 53 which has a primary winding 54 connected to one of the supply terminals 42 and the movable contact 44. The cathodes of both triodes are connected together and their potential, with respect to their control electrodes, is controlled by an adjustable contact 55 on a resistor 56 which is connected between a common ground conductor and the positive terminal of the rectifier circuit 47. Each of the triodes receive their direct current anode voltage from this source in series with resistors 57 and 58.

The anodes of each triode are also connected through blocking capacitors 60 and 61 to a rectifier circuit containing diodes 62 and 63. This circuit is connected to terminals 64 which are for connection to motor 18. If the alternating current voltages produced by windings 48 and 52 are equal, the alternating potentials applied to capacitors 60 and 61 are also equal and, when rectified, the potential difference between terminals 64 is zero and the motor does not turn. However, if one of the alternating current voltages is greater than the other, there will result a direct current potential difference at terminals 64 and the motor 18 is turned to move core 13 up or down until a balance is obtained.

During the operation of this sensing device, the exciter winding 33 generates alternating magnetic flux in the core which travels through the core, the two air gaps, and a portion of the base support 41. Since the reluctance of this magnetic path is almost entirely dependent upon the air gap distances, a movement of the core which increases or shortens the air gap produces a substantially linear change in voltage across the terminals of the detector coil 32. In this manner, the amplitude of the voltage applied to the control electrode and cathode of triode 45 represents the magnitude of the air gap distance.

It has been found that the entire wave forms of the voltages produced by windings 48 and 52 need not be transmitted by the triodes. Since only the differences between these two voltages is of importance, only the tops of the waves are applied to the control electrodes and the cathodes. Greater accuracy is possible and the triodes and their associated circuits do not handle so much power. It is obvious from the above description that the adjustable sliders must be set and maintained at a particular position which must be first calibrated as representing a desired air gap distance.

In FIGS. 1 and 2, the magnetic support member 41 is shown flat. In most applications this surface is cylindrical and is part of a roller. It should be noted, also, that for the greatest accuracy, the optical sensing beam is positioned between the two poles of the core 13. The operation in any case is the same.

The foregoing disclosure and drawings are merely illustrative of the principles of this invention and are not to be interpreted in a limiting sense. The only limitations are to be determined from the scope of the appended claims.

I claim:

1. A differential measuring instrument for determining the thickness of a sheet of material comprising; an optical measuring means for detecting the top surface of a non-magnetic sheet, said optical means including an optical system which directs a beam of light over the top surface of the sheet and a photo-sensitive transducer which receives the beam and delivers a voltage whose amplitude is responsive to the intensity of illumination received; a magnetic measuring device including a ferromagnetic core having two air gaps, an exciting winding, and a detector winding; said detector winding providing an alternating current voltage responsive to the length of the air gaps; a first servomotor electrically connected to said photosensitive transducer; a second servomotor electrically connected to the detector winding; a gear differential mechanically coupled to each of said servomotors, said gear differential including a resultant shaft coupled to a visual indicator which is responsive to the difference in spacing between the optical means and the magnetic device.

2. A differential measuring instrument for determining the thickness of a sheet of material comprising; an optical measuring means for detecting the top surface of a non-magnetic sheet, said optical means including an optical system which directs a beam of light over the top surface of the sheet and a photosensitive transducer which receives the beam and delivers a voltage whose amplitude is responsive to the intensity of illumination received; a magnetic measuring device including a ferromagnetic core having two air gaps, an exciting winding, and a detector winding; said detector winding providing an alternating current voltage responsive to the length of the air gaps; a first servomotor connected to the detector winding; a first screw and nut combination supporting the optical measuring means; a second screw and nut combination supporting the magnetic measuring device; said first servomotor coupled to the first screw and nut combination for adjusting the position of the optical measuring means; said second servomotor coupled to the second screw and nut combination for adjusting the position of the magnetic measuring means; a gear differential mechanically coupled to each of said nuts, said gear differential including a resultant shaft coupled to a visual indicator which is responsive to the difference in spacing between the optical means and the magnetic device.

3. A differential measuring instrument as claimed in claim 2 wherein both the optical means and the magnetic device are secured to the same base.

4. A differential measuring instrument as claimed in claim 2 wherein said visual indicator includes a counter having a plurality of rotatable dials with digit characters thereon for showing the thickness of the sheet.

5. A differential measuring instrument as claimed in claim 2 wherein said resultant shaft is coupled to a recording means for providing a permanent record of the sheet's thickness.

6. A differential measuring instrument as claimed in claim 2 wherein said optical means includes two reflecting mirrors for directing a light beam across the sheet to be measured at grazing incidence.

7. A differential measuring instrument as claimed in claim 2 wherein the exciting winding in said magnetic device is supplied with alternating current power and the resultant flux generated in the ferromagnetic core and the two air gaps is measured by the voltage generated in the detector winding.

8. A differential measuring instrument as claimed in claim 2 wherein a comparison circuit including two amplifier components is connected between the detector winding and the exciting winding, said comparison circuit coupled to the second servomotor.

No references cited.

RICHARD B. WILKINSON, *Primary Examiner.*